United States Patent
Surti et al.

(10) Patent No.: US 10,133,613 B2
(45) Date of Patent: Nov. 20, 2018

(54) DIGITAL ASSISTANT EXTENSIBILITY TO THIRD PARTY APPLICATIONS

(71) Applicant: Microsoft Technology Licensing, LLC, Redmond, WA (US)

(72) Inventors: Tanvi Surti, Seattle, WA (US); Michael Patten, Sammamish, WA (US); Sean Lyndersay, Sammamish, WA (US); Chee Chen Tong, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/712,364

(22) Filed: May 14, 2015

(65) Prior Publication Data
US 2016/0335138 A1 Nov. 17, 2016

(51) Int. Cl.
*G06F 9/54* (2006.01)
*G06F 9/445* (2018.01)
(Continued)

(52) U.S. Cl.
CPC .......... *G06F 9/541* (2013.01); *G06F 9/44505* (2013.01); *G06F 9/44526* (2013.01);
(Continued)

(58) Field of Classification Search
CPC .. G06F 9/541; G06F 9/44526; G06F 9/44505; G06F 17/30654; G06F 9/453;
(Continued)

(56) References Cited

U.S. PATENT DOCUMENTS

| 7,685,561 B2 | 3/2010 | Deem et al. |
| 8,099,472 B2 | 1/2012 | Mahaffey et al. |

(Continued)

OTHER PUBLICATIONS

Beaton et al., "Eclipse Platform Technical Overview", pp. 1-17. (Year: 2006).*
(Continued)

*Primary Examiner* — S. Sough
*Assistant Examiner* — Phuong N Hoang
(74) *Attorney, Agent, or Firm* — Mark K. Young; Mayer & Williams PC

(57) ABSTRACT

A digital assistant includes an extensibility client that interfaces with application extensions that are built by third-party developers so that various aspects of application user experiences, content, or features may be integrated into the digital assistant and rendered as native digital assistant experiences. Application extensions can use a variety of services provided from cloud-based and/or local sources such as language/vocabulary, user preferences, and context services that add intelligence and contextual relevance while enabling the extensions to plug in and operate seamlessly within the digital assistant context. Application extensions may also access and utilize general digital assistant functions, data structures, and libraries exposed by the services and implement application domain-specific context and behaviors using the programming features captured in the extension. Such extensibility to third party applications can broaden the scope of the database of information that the digital assistant may use to answer questions and perform actions for the user.

18 Claims, 19 Drawing Sheets

(51) Int. Cl.
*H04L 29/08* (2006.01)
*G06F 17/30* (2006.01)
*H04M 1/725* (2006.01)
*H04W 4/80* (2018.01)
*G06F 9/451* (2018.01)

(52) U.S. Cl.
CPC .. *G06F 17/30654* (2013.01); *H04L 29/08648* (2013.01); *H04L 67/28* (2013.01); *H04M 1/72519* (2013.01); *G06F 9/453* (2018.02); *H04M 1/72525* (2013.01); *H04M 2250/22* (2013.01); *H04M 2250/74* (2013.01); *H04W 4/80* (2018.02)

(58) Field of Classification Search
CPC ......... H04M 1/72519; H04M 2250/22; H04M 2250/74; H04M 1/72525; H04L 67/28; H04L 29/08648; H04W 4/80
See application file for complete search history.

(56) References Cited

U.S. PATENT DOCUMENTS

| | | | | |
|---|---|---|---|---|
| 8,270,606 | B2* | 9/2012 | Caskey | G06F 17/289 380/255 |
| 8,650,320 | B1* | 2/2014 | Merrick | H04L 69/18 370/465 |
| 8,667,514 | B2 | 3/2014 | Rastogi et al. | |
| 8,745,573 | B2 | 6/2014 | Ben-Artzi et al. | |
| 8,881,179 | B2 | 11/2014 | Labra et al. | |
| 9,003,431 | B2 | 4/2015 | You et al. | |
| 9,389,928 | B1 | 7/2016 | Surti et al. | |
| 9,658,866 | B2 | 5/2017 | Jorgensen et al. | |
| 9,817,966 | B2 | 11/2017 | Surti et al. | |
| 2005/0243019 | A1* | 11/2005 | Fuller | G06F 9/542 345/1.3 |
| 2008/0155698 | A1 | 6/2008 | Round | |
| 2008/0160956 | A1* | 7/2008 | Jackson | H04M 3/02 455/406 |
| 2008/0222238 | A1 | 9/2008 | Ivanov et al. | |
| 2009/0077248 | A1* | 3/2009 | Castellucci | H04L 12/14 709/229 |
| 2010/0061534 | A1* | 3/2010 | Wang | H04M 3/4936 379/201.03 |
| 2011/0035742 | A1* | 2/2011 | Shenfield | G06F 9/44521 717/171 |
| 2011/0319056 | A1* | 12/2011 | Toy | H04W 12/06 455/412.2 |
| 2012/0144407 | A1* | 6/2012 | Hacigumus | G06F 9/544 719/328 |
| 2012/0331488 | A1 | 12/2012 | Marathe et al. | |
| 2013/0055285 | A1 | 2/2013 | Merry et al. | |
| 2013/0086155 | A1 | 4/2013 | Thomas et al. | |
| 2013/0125145 | A1 | 5/2013 | Balmori Labra et al. | |
| 2013/0152070 | A1* | 6/2013 | Bhullar | G06F 17/30887 717/173 |
| 2013/0152092 | A1 | 6/2013 | Yadgar | |
| 2013/0152217 | A1 | 6/2013 | Park | |
| 2013/0159377 | A1 | 6/2013 | Nash | |
| 2013/0254139 | A1 | 9/2013 | Lei | |
| 2013/0311997 | A1 | 11/2013 | Gruber et al. | |
| 2014/0047359 | A1 | 2/2014 | Teigene et al. | |
| 2014/0053126 | A1 | 2/2014 | Watson et al. | |
| 2014/0082501 | A1 | 3/2014 | Bae et al. | |
| 2014/0141875 | A1 | 5/2014 | Faria | |
| 2014/0163976 | A1 | 6/2014 | Park et al. | |
| 2014/0164400 | A1 | 6/2014 | Kruglick | |
| 2014/0173448 | A1 | 6/2014 | Aly et al. | |
| 2014/0240363 | A1* | 8/2014 | Hong | G09G 5/34 345/684 |
| 2014/0331317 | A1* | 11/2014 | Singh | G06F 21/52 726/22 |
| 2015/0222664 | A1* | 8/2015 | Battre | H04L 63/20 726/1 |
| 2015/0281869 | A1* | 10/2015 | Ramachandran | H04W 4/001 455/418 |
| 2016/0012350 | A1* | 1/2016 | Narayanan | G06N 99/005 706/12 |
| 2016/0321449 | A1 | 11/2016 | Surti et al. | |
| 2016/0335138 | A1 | 11/2016 | Surti et al. | |
| 2017/0255494 | A1 | 9/2017 | Bartfai-walcott et al. | |
| 2018/0068109 | A1 | 3/2018 | Surti et al. | |

OTHER PUBLICATIONS

"Personal assistant Android app Friday learns your habits, makes recommendations" Published Date: Aug. 11, 2012 http://articles.courant.com/2012-08-11/business/hc-ls-android-friday-app-20120811_1_android-app-third-party-developers (2 pages total).

Levy, Steven, "Siri's Inventors Are Building a Radical New A1 That Does Anything You Ask" Published Date: Aug. 12, 2014, http://www.wired.com/2014/08/viv/ (24 pages total).

Edwards, Luke "Windows Phone 8.1 brings Cortana smart assistant to the world of Siri and Google Now" Published Date: Apr. 2, 2014, http://www.pocket-lint.com/news/128243-windows-phone-8-1-brings-cortana-smart-assistant-to-the-world-of-siri-and-google-now (8 pages total).

Etherington, Darrell, "Apple Working on More Third-Party Integrations for Siri With iWatch in Mind, Report Claims" Published Date: Mar. 5, 2014, http://techcrunch.com/2014/03/05/apple-working-on-more-third-party-integrations-for-siri-with-iwatch-in-mind-report-claims/ (4 pages total).

"How to Use Google Now on Dektop Pc Using Chrome" Retrieved Date: Sep. 26, 2014, http://www.avoiderrors.net/google-now-desktop-pc/ (3 pages total).

Mccracken, Harry, "EasilyDo 3.0: A Do-Everything Personal Assistant for Your Smartphone" Published Date: Feb. 13, 2014, http://techland.time.com/2014/02/13/easilydo-3-0-a-do-everything-personal-assistant-for-your-smartphone/ (3 pages total).

"Meet your new Personal Assistant: Speaktoit (Mobile App)" Retrieved Date: Sep. 26, 2014, http://7labs.heypub.com/mobile/meet-your-new-personal-assistant-speaktoit-mobile-app.html (6 pages total).

"Sherpa Beta Personal Assistant" Published Date: Sep. 24, 2014, https://play.google.com/store/apps/details?id=com.sherpa.asistentesherpa&hl=en (3 pages total).

Biancuzzo, Marty, "Hate Daily Chores? Get These Apps . . . " Published Date: Jun. 19, 2014, http://www.wallstreetdaily.com/2014/06/19/instacart-postmates-apps/ (10 pages total).

"Guile", Retrieved from <http://www.gnu.org/software/guile/> on Oct. 28, 2014, Feb. 22, 2012, (2 pages total).

"Handling Common Scenarios", Retrieved from https://developer.apple.com/library/ios/documentation/General/Conceptual/ExtensibilityPG/ExtensionScenarios.html on Oct. 28, 2014, Sep. 17, 2014, (7 pages total).

Viticci,"iOS 8 Extensions: Apple's Plan for a Powerful App Ecosystem", Retrieved from http://www.macstories.net/stories/ios-8-extensions-apples-plan-for-a-powerful-appecosystem/ on Oct. 28, 2014, Jun. 29, 2014, (21 pages total).

"Message Passing", Retrieved from https://developer.chrome.com/extensions/messaging> on Oct. 28, 2014, Feb. 28, 2014, (9 pages total).

"Building Cross Platform Applications Overview", Retrieved from http://developer.xamarin.com/guides/crossplatform/application_fundamentals/building_cross_platform_applications/part_0_-_overview/, Jul. 12, 2014 (3 pages total).

Chambers, et al., "Integrating Your Application Into the Windows Phone Speech and Natural Language Experience", Retrieved from <<https://channel9.msdn.com/Events/Build/2014/2-530>>, Apr. 2, 2014, 64 Pages.

Doran, et al., "Cortana Extensibility in Universal Windows Apps", Retrieved from <<https://channel9.msdn.com/Events/Build/2015/2-691>>, Apr. 30, 2015, 42 Pages.

Milhorat, et al., "Building the Next Generation of Personal Digital Assistants", In Proceedings of 1st International Conference on Advanced Technologies for Signal and Image Processing, Mar. 17, 2014, pp. 458-463., 6 pages.

(56) References Cited

OTHER PUBLICATIONS

"International Search Report & Written Opinion Issued in PCT Application No. PCT/US2016/027653", dated Jun. 22, 2016, 17 Pages.
"International Preliminary Report on Patentability Issued in PCT Application No. PCT/US2016/027653", dated Jun. 27, 2017, 10 Pages.
"Second Written Opinion Issued in PCT Application No. PCT/US2016/027653", dated Mar. 23, 2017, 9 Pages.
"Notice of Allowance Issued in U.S. Appl. No. 14/619,776", dated Mar. 2, 2016, 9 Pages.
"International Search Report and Written Opinion Issued in PCT Application No. PCT/US2016/017044", dated Apr. 21, 2016, 11 Pages.
"Second Written Opinion Issued in PCT Application No. PCT/US2016/017044", dated Feb. 6, 2017, 5 Pages.
"International Preliminary Report on Patentability Issued in PCT Application No. PCT/US2016/017044", dated May 18, 2017, 6 Pages.
"Non-Final Office Action Issued in U.S. Appl. No. 15/206,870", dated Mar. 24, 2017, 7 Pages.
"Notice of Allowance Issued in U.S. Appl. No. 15/206,870", dated Jul. 14, 2017, 5 Pages.
"Office Action Issued in Colombian Patent Application No. NC2017/0011488", dated Nov. 10, 2017, 4 Pages.

* cited by examiner

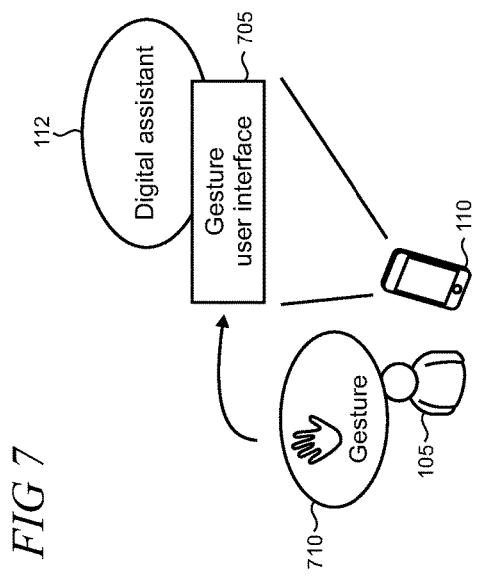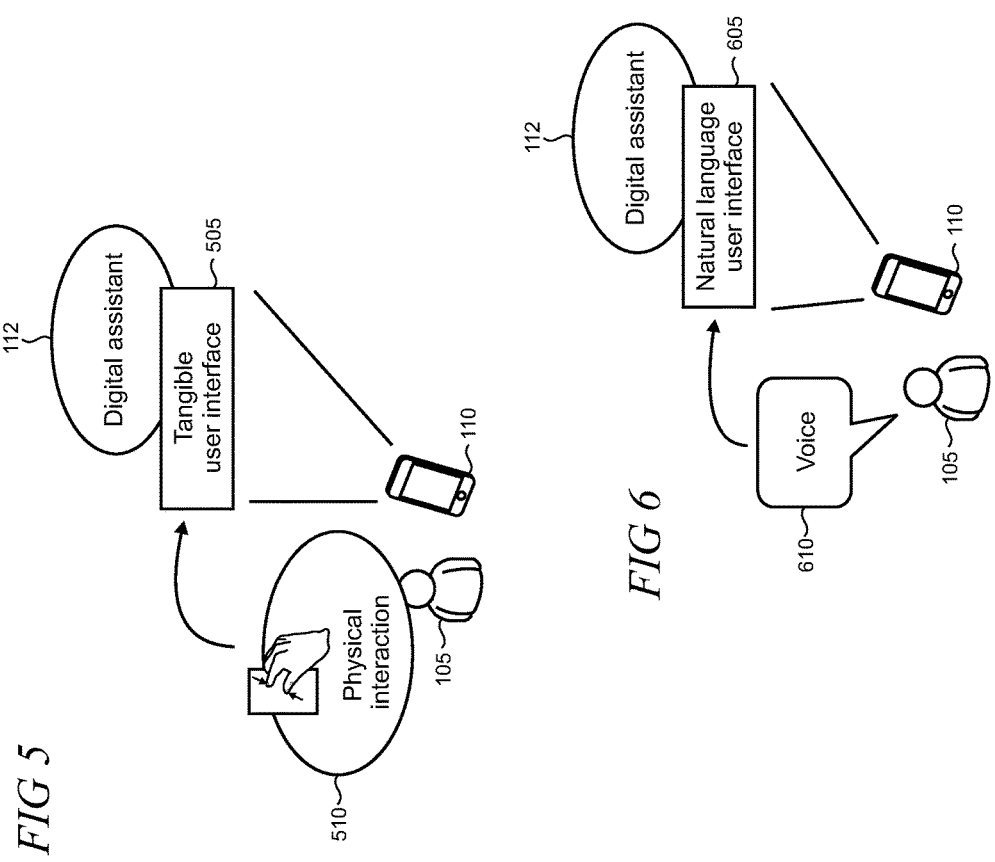

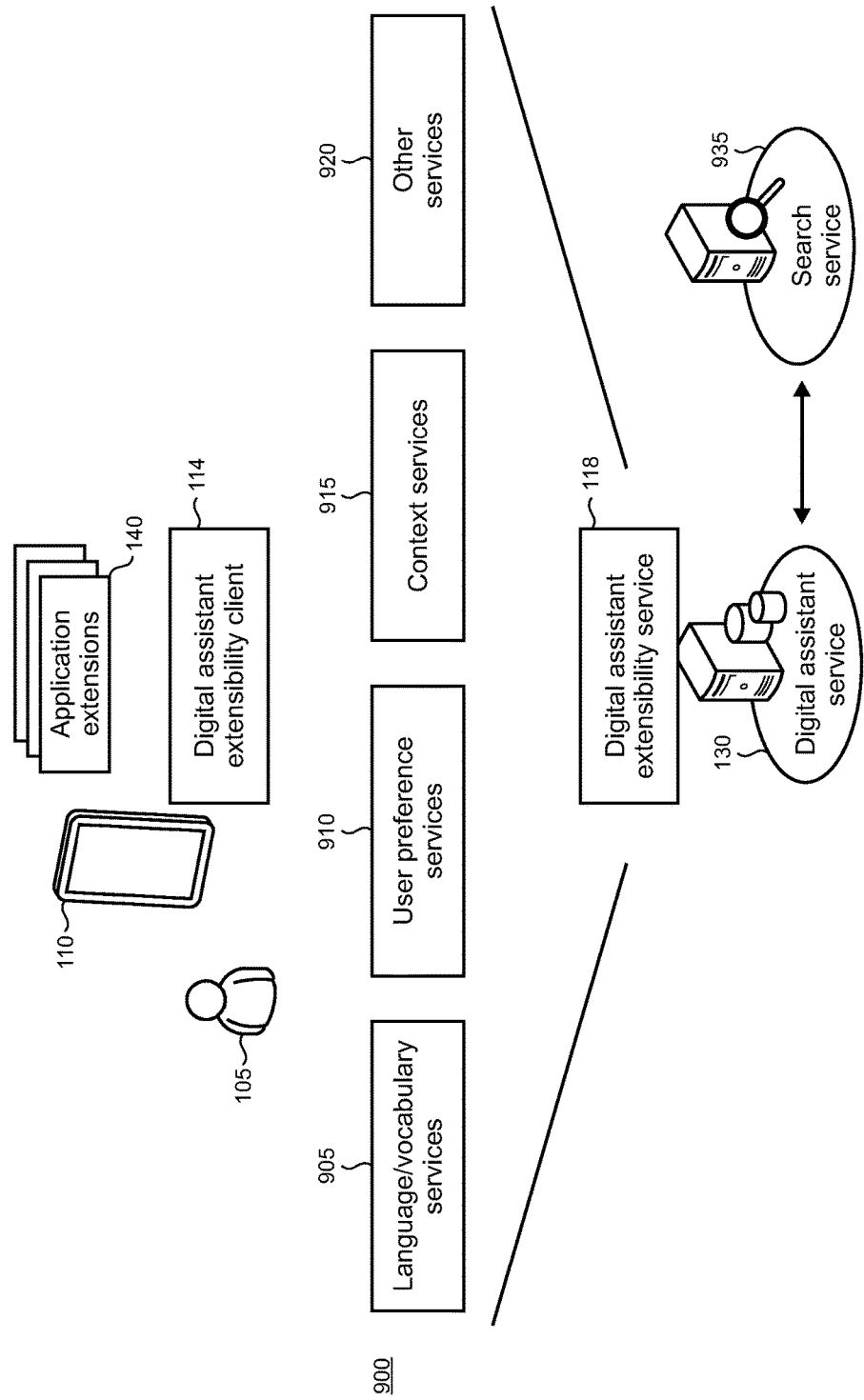

US 10,133,613 B2

DIGITAL ASSISTANT EXTENSIBILITY TO THIRD PARTY APPLICATIONS

BACKGROUND

Digital assistants can provide a variety of features for device users and can make it easier to interact with devices to perform tasks, get information, and stay connected with friends and colleagues using voice interactions. Typically, the user can interact with the digital assistant using voice inputs, and the digital assistant can speak to the user using its own voice. Current features perform in a satisfactory manner for many use scenarios, but increased functionality can make digital assistants even more beneficial and productive.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A digital assistant supported on a device such as a smartphone, tablet, personal computer (PC), game console, or the like includes an extensibility client that interfaces with application extensions that are built by third-party developers so that various aspects of application user experiences, content, or features may be integrated into the digital assistant and rendered as native digital assistant experiences. Application extensions can use a variety of services provided from cloud-based and/or local sources such as language/vocabulary, user preferences, and context services that add intelligence and contextual relevance while enabling the extensions to plug in and operate seamlessly within the digital assistant context. Application extensions may also access and utilize general digital assistant functions, data structures, and libraries exposed by the services and implement application domain-specific context and behaviors using the programming features captured in the extension. Such extensibility to third party applications can broaden the scope of the database of information that the digital assistant may use to answer questions and perform actions for the user.

The present digital assistant extensibility enables increased user efficiency in obtaining information and performing tasks using the digital assistant and improves overall user interaction performance with the device. By broadening the information database that is available to the digital assistant, the extensibility improves the quality of answers and enables a wider and more comprehensive set of responses and actions to be supported on the device. This can reduce the number of attempts to obtain needed information which lowers the likelihood of unintentional inputs to the device that can cause additional resource consumption and user frustration. In addition, the extensibility enables devices to more efficiently utilize available computing resources including network bandwidth, processing cycles, memory, and battery life in some cases. For example, data describing context and user behaviors that is maintained by the digital assistant can be utilized to make the applications operate more efficiently in delivering tailored content, information, and user experiences which can reduce network bandwidth requirements and the load on processing, storage, and memory resources on the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 5, 6, and 7 show illustrative interfaces between a user and a digital assistant;

FIG. 9 shows illustrative services exposed by a digital assistant extensibility service;

Like reference numerals indicate like elements in the drawings. Elements are not drawn to scale unless otherwise indicated.

DETAILED DESCRIPTION

Figure 1:
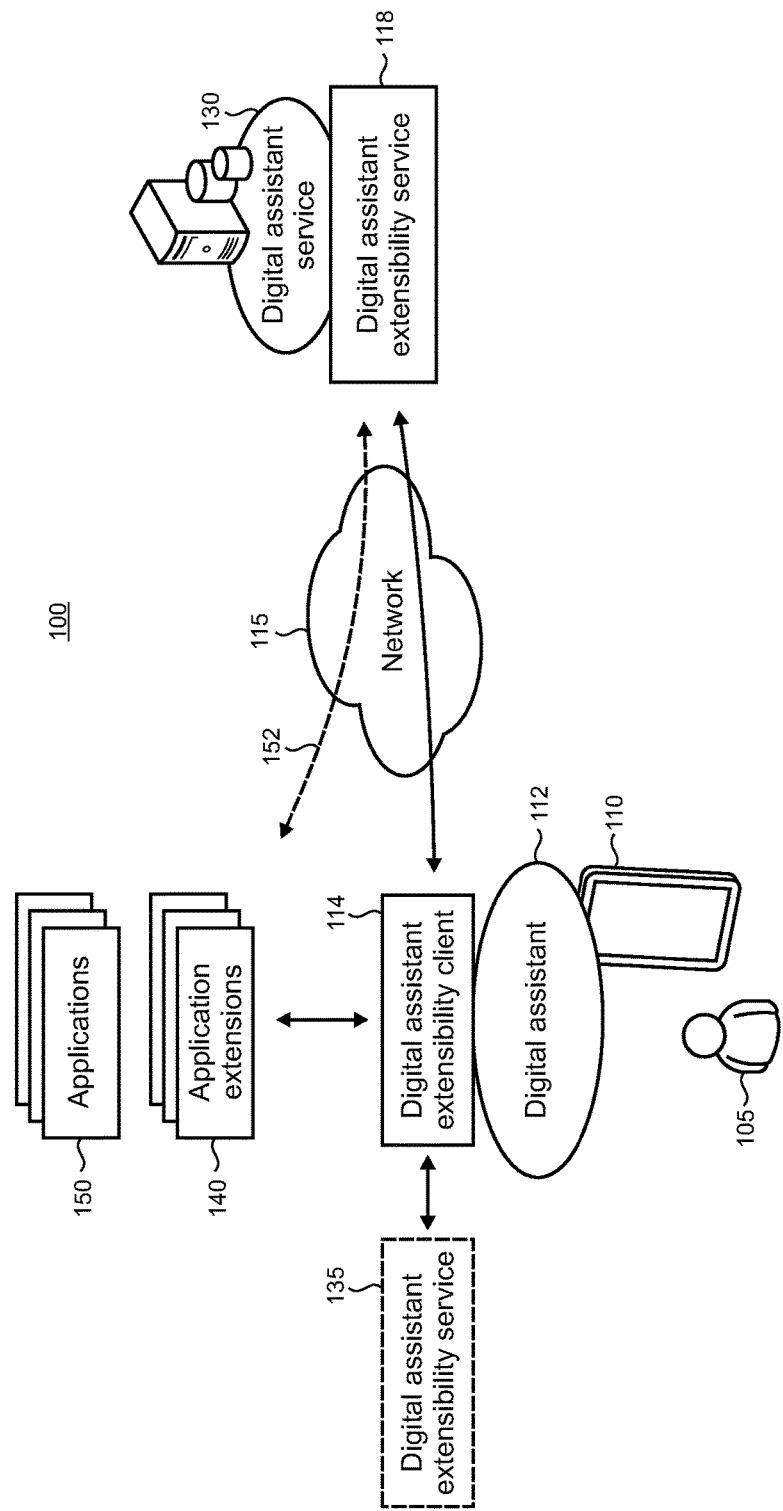
FIG. 1 shows an illustrative digital assistant that includes an extensibility client to interface with third party applications and extensions.

FIG. 1 shows an overview of a digital assistant extensibility arrangement 100 in which a user 105 employs a device 110 that hosts a digital assistant 112. The digital assistant 112 supports an extensibility client 114 that typically interoperates over a network 115 with an extensibility service 118 supported by a remote digital assistant service 130. Alternatively, an extensibility service can be partly or fully instantiated as a local service 135 in some cases. The digital assistant extensibility client 114 is configured to enable interaction with application extensions 140 so that various aspects of an application's user experiences, features, and content can be integrated with the digital assistant 112. Typically the extensibility is implemented so that applications can render user experiences, features, and content using the digital assistant with a similar and consistent sound, look, and feel in most cases so that transitions between the applications and the digital assistant are handled smoothly and the experiences are rendered seamlessly to the user.

The extensions 140 can be associated with third party applications 150 in some cases in which the application authors, developers, or providers are entities that are not the same as the provider of the digital assistant 112. First party applications can also be supported in some implementations. In some cases, the digital assistant extensibility service 118 may support direct interaction with the applications 150, as indicated by line 152 in FIG. 1.

Figure 2:
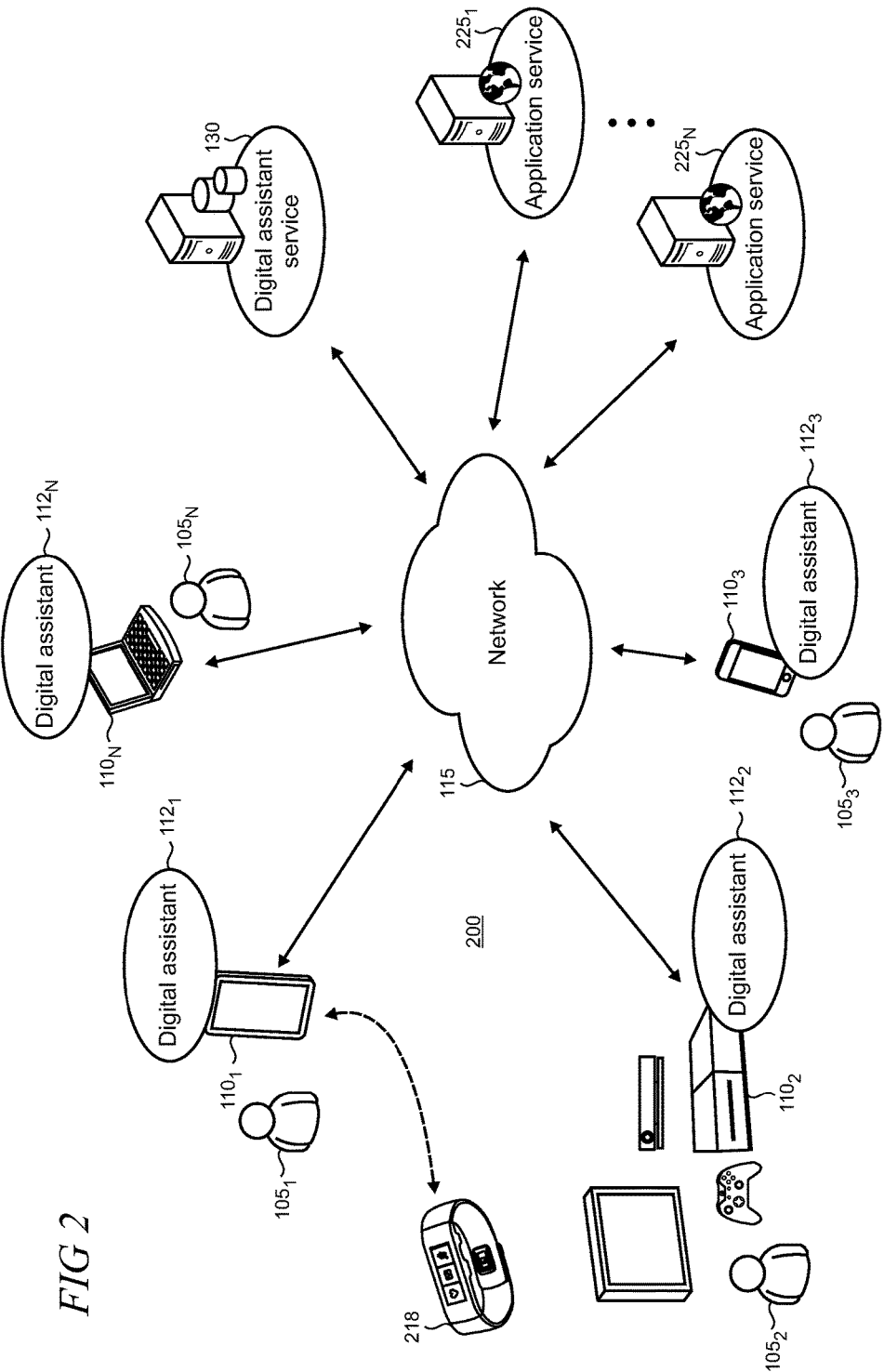
FIG. 2 shows an illustrative computing environment in which devices can communicate and interact with application services over a network.

Various details of illustrative implementations of digital assistant extensibility are now presented. FIG. 2 shows an illustrative environment 200 in which various users 105 employ respective devices 110 that communicate over the network 115. Each device 110 includes an instance of the digital assistant 112. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

Accessory devices 218, such as wristbands and other wearable devices may also be present in the environment 200. Such accessory device 218 typically is adapted to interoperate with a device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110.

The devices 110 can typically utilize the network 115 in order to access and/or implement various user experiences. The network can include any of a variety of network types and network infrastructure in various combinations or subcombinations including cellular networks, satellite networks, IP (Internet-Protocol) networks such as Wi-Fi and Ethernet networks, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet or include interfaces that support a connection to the Internet so that the devices 110 can access content provided by one or more content providers and also render user experiences supported by various application services 225. The application services 225 can respectively support a diversity of applications such as social networking, mapping, news and information, entertainment, travel, productivity, finance, etc. The digital assistant service 130 (described in more detail below) is also present in the computing environment 200.

Figure 3:
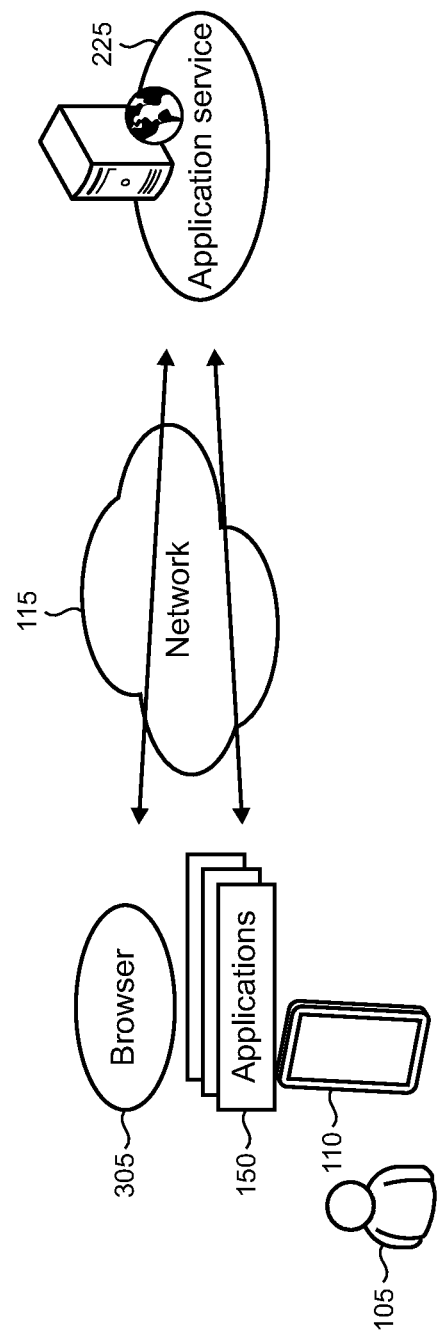
FIG. 3 shows a local application and/or a browser interacting with a remote application service.

As shown in FIG. 3, a device 110 can typically include a local component such as a browser 305 or one or more applications 150 that can facilitate interaction with an application service 225. For example, in some scenarios, a user 105 may launch a locally executing application that communicates over the network to the service in order to retrieve data to enable various features and functions, provide information, and/or support a given user experience that can be rendered on the user interface of the local device 110. In some scenarios, an application may operate locally on the device without needing to interface with a remote service.

Figure 4:
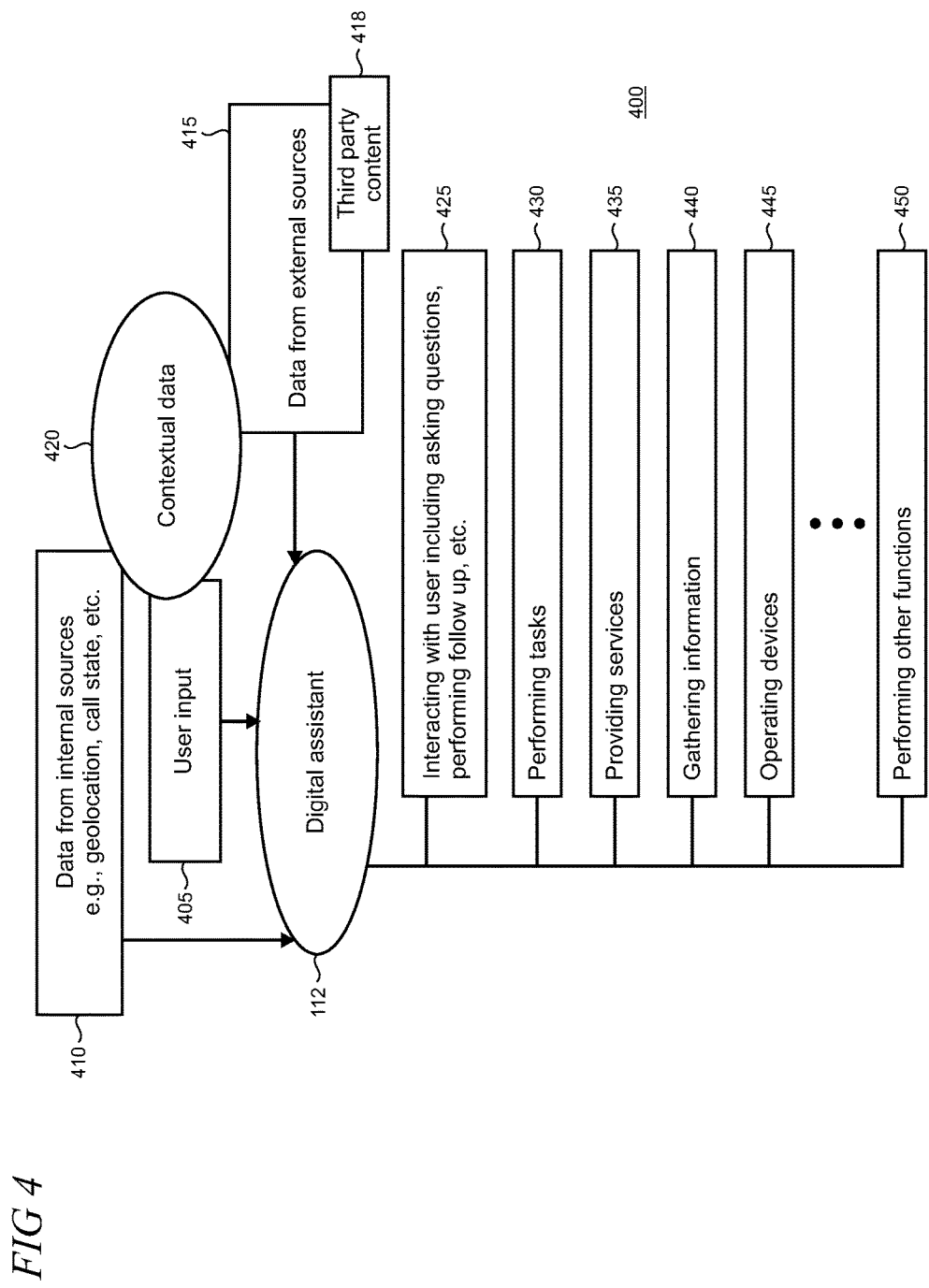
FIG. 4 shows illustrative inputs to a digital assistant and an illustrative taxonomy of general functions that may be performed by a digital assistant.

FIG. 4 shows an illustrative taxonomy of functions 400 that may typically be supported by the digital assistant 112 either natively or in combination with an application 150. Inputs to the digital assistant 112 typically can include user input 405, data from internal sources 410, and data from external sources 415 which can include third-party content 418. For example, data from internal sources 410 could include the current location of the device 110 that is reported by a GPS (Global Positioning System) component on the device, or some other location-aware component. The externally sourced data 415 includes data provided, for example, by external systems, databases, services, and the like.

The various inputs can be used alone or in various combinations to enable the digital assistant 112 to utilize contextual data 420 when it operates. Contextual data can include, for example, time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the functions 400 illustratively include interacting with the user 425 (through the natural language UI and other graphical UIs, for example); performing tasks 430 (e.g., making note of appointments in the user's calendar, sending messages and emails, etc.); providing services 435 (e.g., answering questions from the user, mapping directions to a destination, setting alarms, forwarding notifications, reading emails, news, blogs, etc.); gathering information 440 (e.g., finding information requested by the user about a book or movie, locating the nearest Italian restaurant, etc.); operating devices 445 (e.g., setting preferences, adjusting screen brightness, turning wireless connections such as Wi-Fi and Bluetooth on and off, communicating with other devices, controlling smart appliances, etc.); and performing various other functions 450. The list of functions 400 is not intended to be exhaustive and other functions may be provided by the digital assistant 112 and/or applications 150 as may be needed for a particular implementation of the present digital assistant extensibility.

A user can typically interact with the digital assistant 112 in a number of ways depending on the features and functionalities supported by a given device 110. For example, as shown in FIG. 5, the digital assistant 112 may expose a tangible user interface 505 that enables the user 105 to employ physical interactions 510 in support of user experiences on the device 110. Such physical interactions can include manipulation of physical and/or virtual controls such as buttons, menus, keyboards, etc., using touch-based inputs like tapping, flicking, dragging, etc. on a touchscreen, and the like.

In some implementations, the digital assistant 112 may expose a natural language user interface 605 shown in FIG. 6, or alternatively a voice command-based user interface (not shown), with which the user employs voice 610 to provide various inputs to the device 110.

In other implementations, the digital assistant 112 may expose a gesture user interface 705 shown in FIG. 7 with which the user 105 employs gestures 710 to provide inputs to the device 110. It is noted that in some cases, combinations of user interfaces may be utilized where the user may employ, for example, both voice and physical inputs to interact with the digital assistant 112 and the device 110. The user gestures can be sensed using various techniques such as optical sensing, touch sensing, proximity sensing, and the like.

Figure 8:
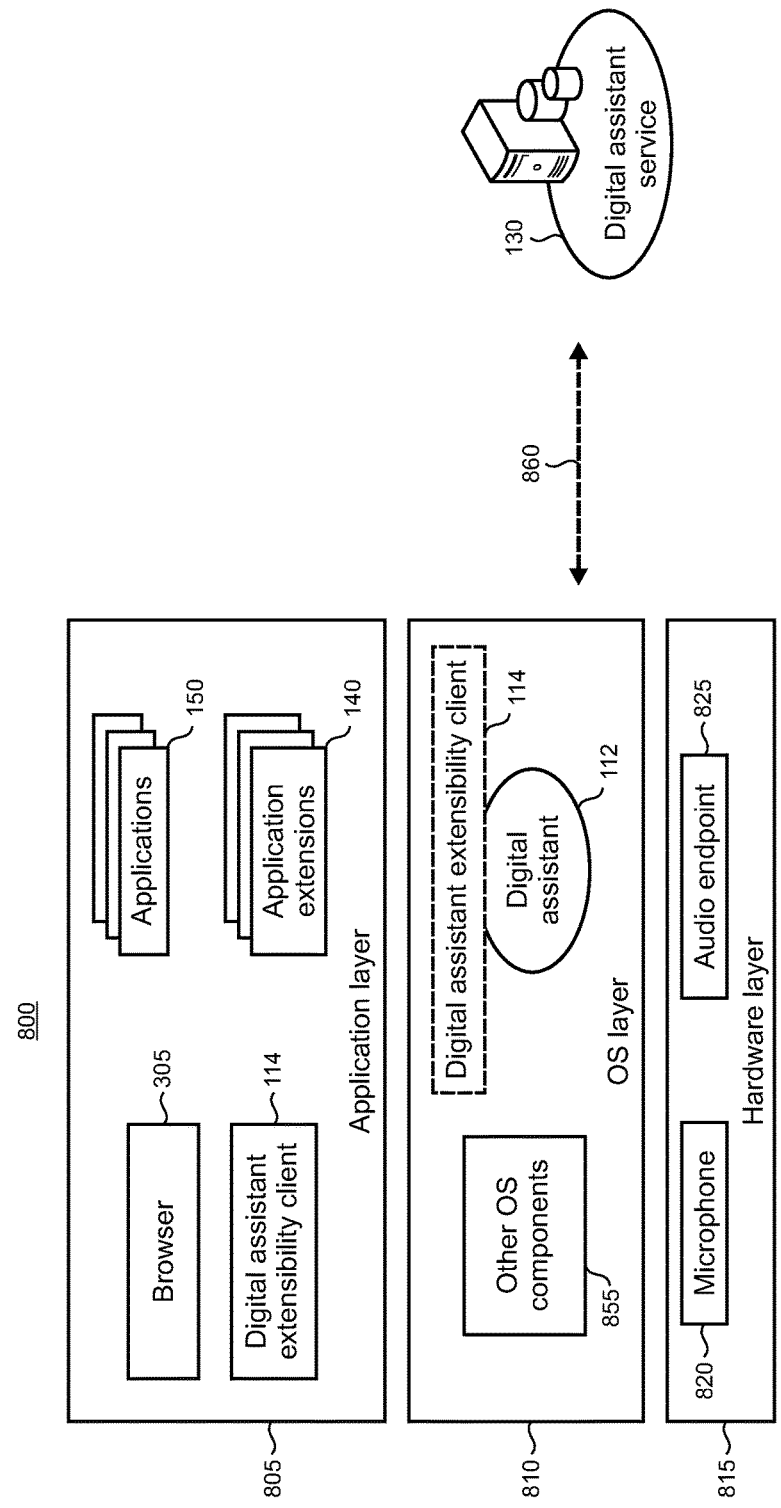
FIG. 8 shows an illustrative layered architecture that includes a digital assistant component, extensibility client, and application extensions.

FIG. 8 shows an illustrative layered architecture 800 that may be instantiated on a given device 110. The architecture 800 is typically implemented in software, although combinations of software, firmware, and/or hardware may also be utilized in some cases. The architecture 800 is arranged in layers and includes an application layer 805, an OS (operating system) layer 810, and a hardware layer 815. The hardware layer 815 provides an abstraction of the various hardware used by the device 110 (e.g., input and output devices, networking and radio hardware, etc.) to the layers above it. In this illustrative example, the hardware layers support a microphone 820 and an audio endpoint 825 which may include, for example, the device's internal speaker, a wired or wireless headset/earpiece, external speaker/device, and the like.

The application layer 805 in this illustrative example supports various applications 150 (e.g., web browser, map application, email application, news application, etc.), as well as the digital assistant extensibility client 114. The applications are often implemented using locally executing code. However in some cases, these applications can rely on services and/or remote code execution provided by remote servers or other computing platforms such as those supported by a service provider or other cloud-based resources. While the digital assistant extensibility client 114 is shown here as a component that is instantiated in the application layer 805, it will be appreciated that the functionality provided by a given application may be implemented, in whole or part, using components that are supported in either the OS or hardware layers.

The OS layer 810 supports the digital assistant 112 and various other OS components 855. In typical implementations, the digital assistant 112 can interact with the digital assistant service 130, as indicated by line 860. That is, the digital assistant 112 in some implementations can partially utilize or fully utilize remote code execution supported at the service 130, or using other remote resources. In addition, it may utilize and/or interact with the other OS components 855 (and/or other components that are instantiated in the other layers of the architecture 800) as may be needed to implement the various features and functions described herein. In some implementations, some or all of the functionalities supported by the digital assistant extensibility client 114 can be incorporated into the digital assistant as shown by the dashed rectangle in FIG. 8. As noted above, the digital assistant 112 can also interact with extensibility services that are partially or fully instantiated locally on the device 110. For example, the services can apply local resources and implement local logic in order to support a variety of user experiences and features.

FIG. 9 shows illustrative services 900 that may be exposed by the remote digital assistant extensibility service 118 and local client 114 to the application extensions 140. The services 900 can also be implemented and/or rendered locally on the device 110 in whole or part by the extensibility client 114 and/or the local digital assistant extensibility service 135 (FIG. 1). Alternatively, some or all of the services may be directly provided to the applications from the extensibility service 118 in some cases using interfaces (not shown) that enable remote access. The service 130 may access other services from a variety of providers, such as search service 935, as may be needed to support the provisioning of the services 900.

The language and vocabulary services 905 can support utilization of different languages by extensions when providing data and/or services to the digital assistant. For example, some applications may be utilized in multi-lingual settings while other applications may have regional or global distribution that makes it appealing to support multiple languages. The vocabulary services may support application utilization of specialized and/or industry-specific vocabularies. For example, technical and scientific vocabularies can be supported for an application dealing with computer and technology news. Thus, a news reading application could access the vocabulary services so that a particular term is correctly pronounced when an article is read aloud to the user 105 by the digital assistant.

The user preference services 910 may enable extensions to take into account user preferences that are maintained by the digital assistant when providing data and services. The context services 915 likewise can enable extensions to use the contextual data that is maintained by the digital assistant. Other services 920 can also be exposed by the extensibility service 118 to meet the needs of a particular implementation.

Figure 10:
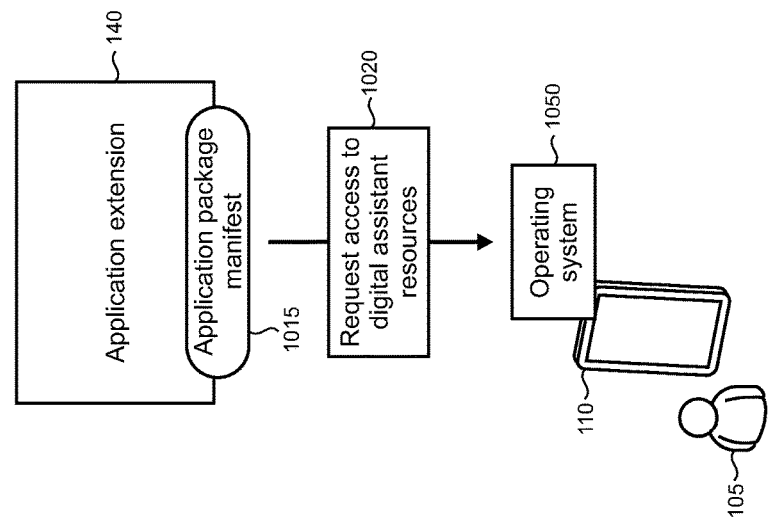
FIG. 10 shows illustrative interactions between an application extension and an operating system on a device during application installation.

As shown in FIG. 10, during installation of an application extension 140 on a device 110, an application package manifest 1015, or similar installation package that is utilized to validate and deploy the application, is configured to launch a request 1020 to access digital assistant resources. Typically, the request describes the extensibility points of interaction for the application, a description of capabilities and resources required, and the like to facilitate interaction between the application and the operating system 1050 and/or digital assistant components executing thereon.

Figure 11:
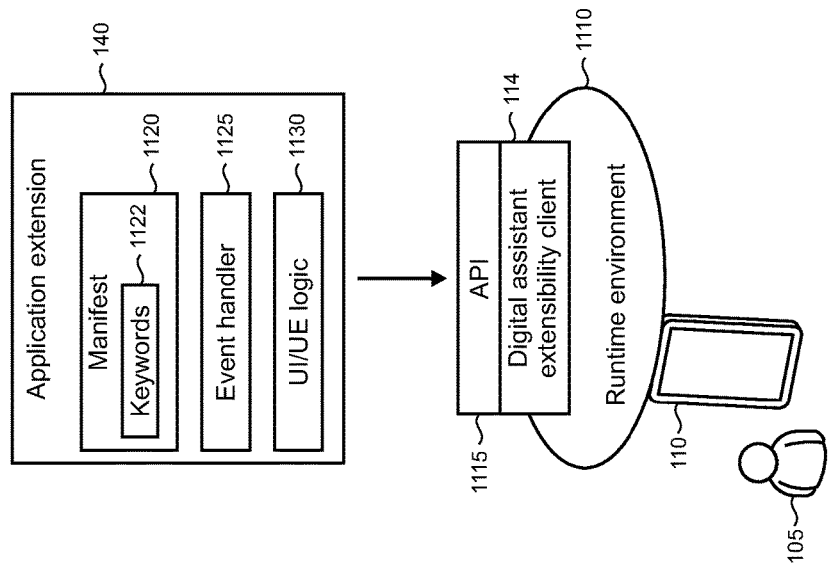
FIG. 11 shows illustrative interactions between an application extension and a digital assistant extensibility client during application runtime.

As shown in FIG. 11, during application extension operation at runtime on a device 110 in a runtime environment 1110, an application extension 140 can interface with the digital assistant extensibility client 114 through an application programming interface (API) 1115 and load a manifest 1120 that can include application-specific resources such as graphics, audio, commands, and other information. For example, the manifest 1120 can include keywords 1122 that can be loaded from the manifest and registered with the digital assistant extensibility client. The registered keywords may be invoked by the user at runtime and input events can be directed to the appropriate application extension. Application names are typical examples of keywords so that a user can direct the digital assistant to launch an application by name or obtain information, services, content and the like from a named application. During runtime, the extensibility client 114 can pass events associated with user inputs, actions, and behaviors to an event handler 1125 in the application extension. The application extension can apply logic 1130 such as scripts and other programming constructs in order to facilitate a particular user experience or user interface through the digital assistant.

Figure 12:
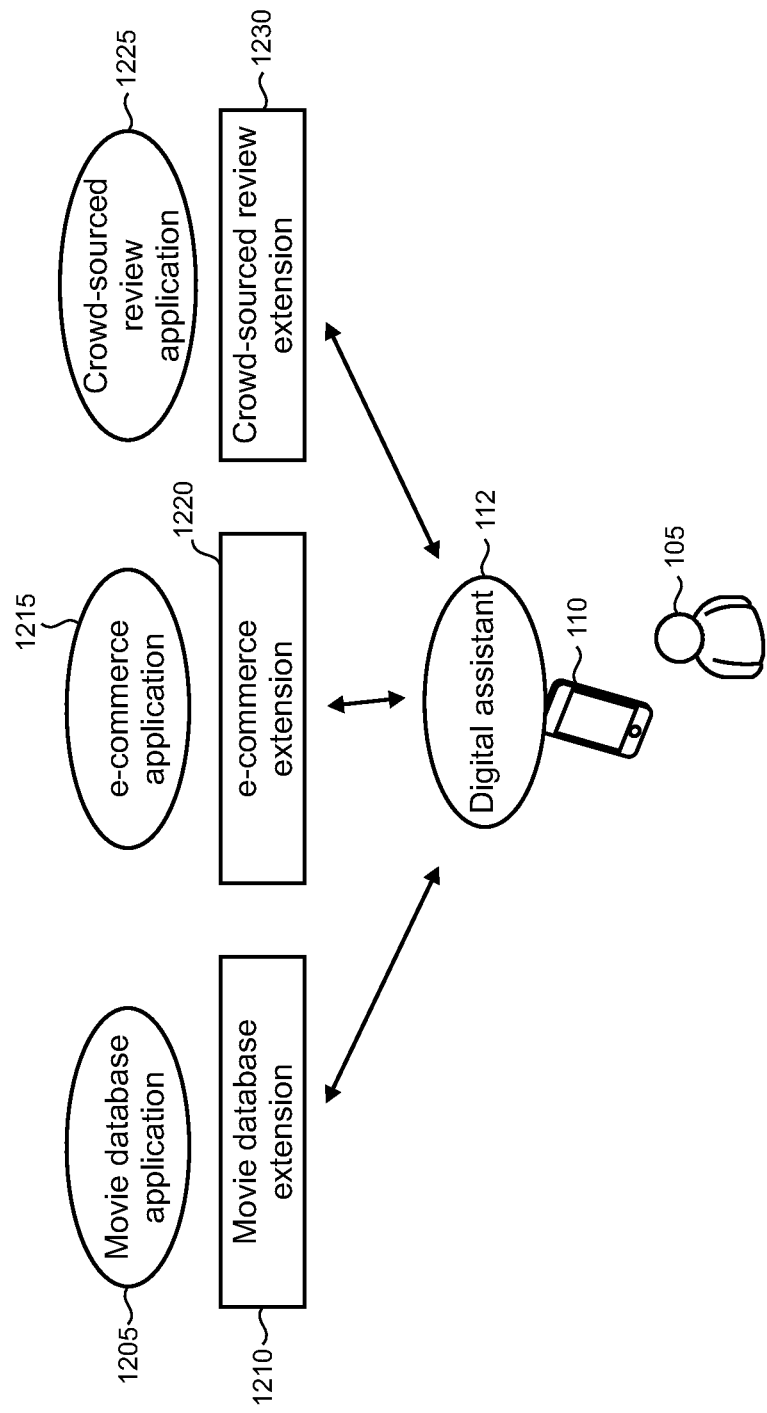
FIG. 12 shows three illustrative application extensions that are installed on a device.

FIG. 12 shows three illustrative applications and corresponding extensions that are installed on a device 110. The applications include a movie database application 1205 and extension 1210, an e-commerce application 1215 and extension 1220, and a crowd-sourced review application 1225 and extension 1230. It is emphasized that the applications and extensions are intended to be illustrative and that any of a variety of applications and extensions may be utilized in a given scenario.

Figure 13:
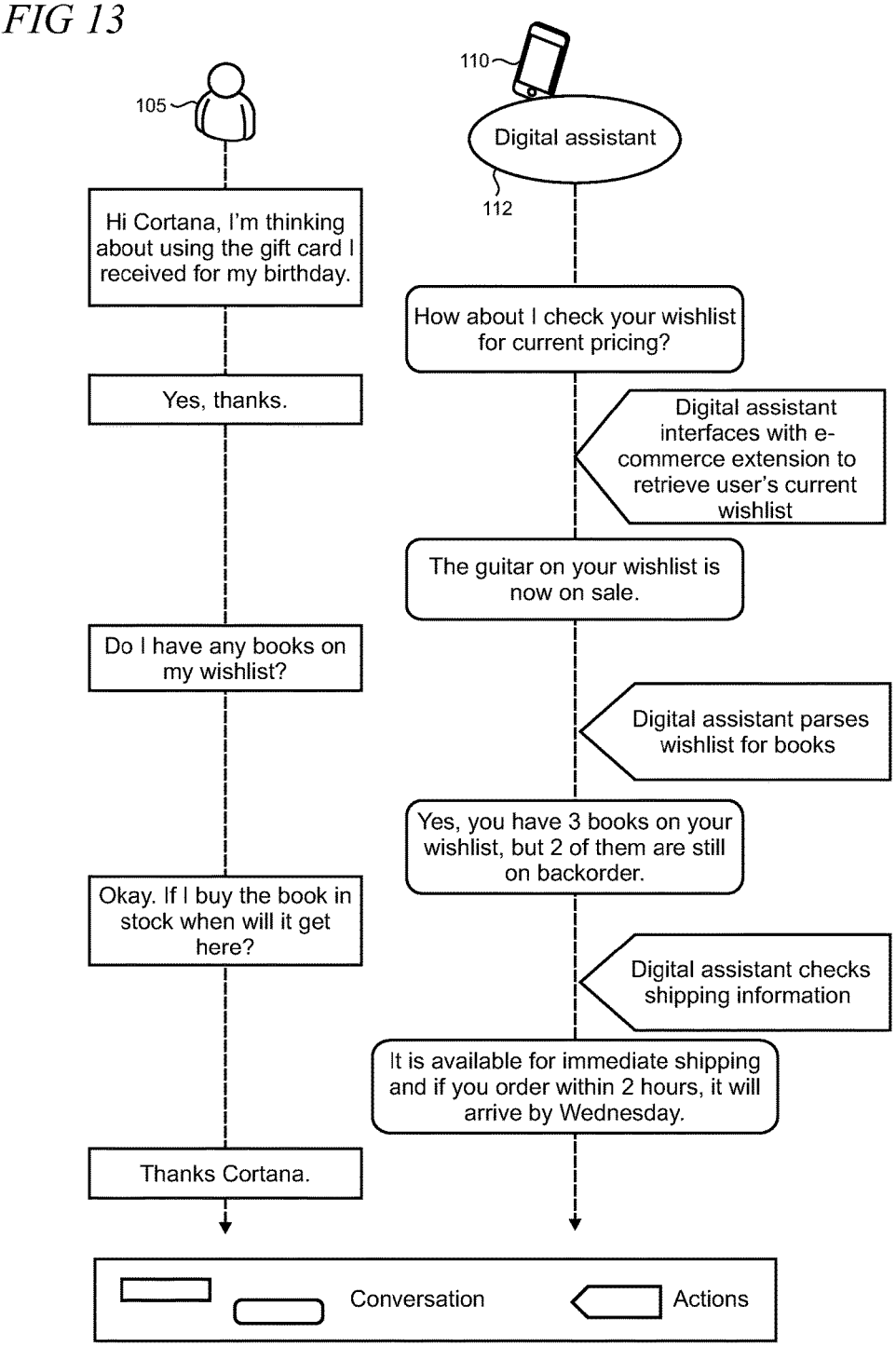
FIGS. 13, 14, and 15 show illustrative digital assistant extensibility user experience scenarios.
Figure 14:
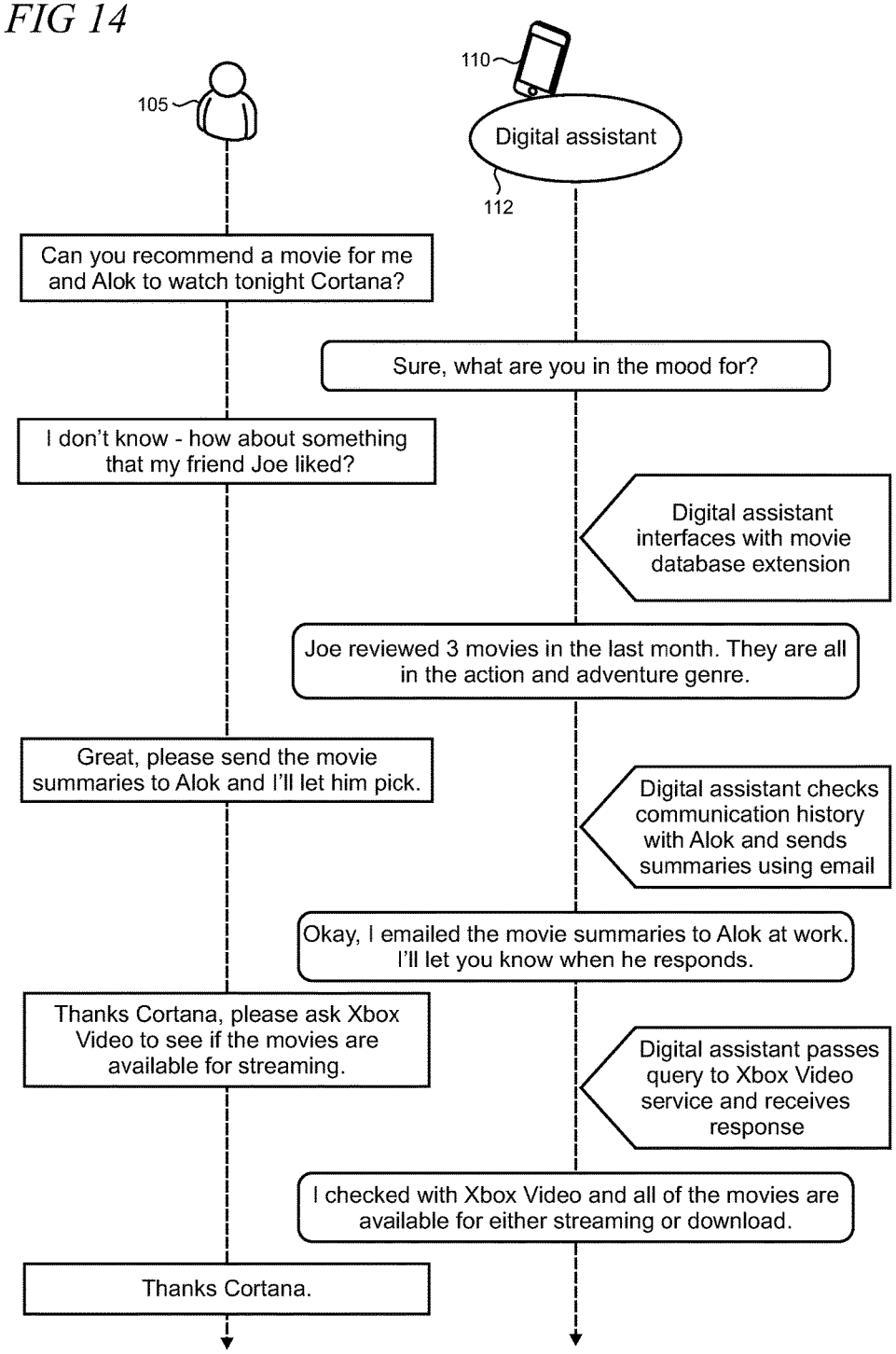
Figure 15:
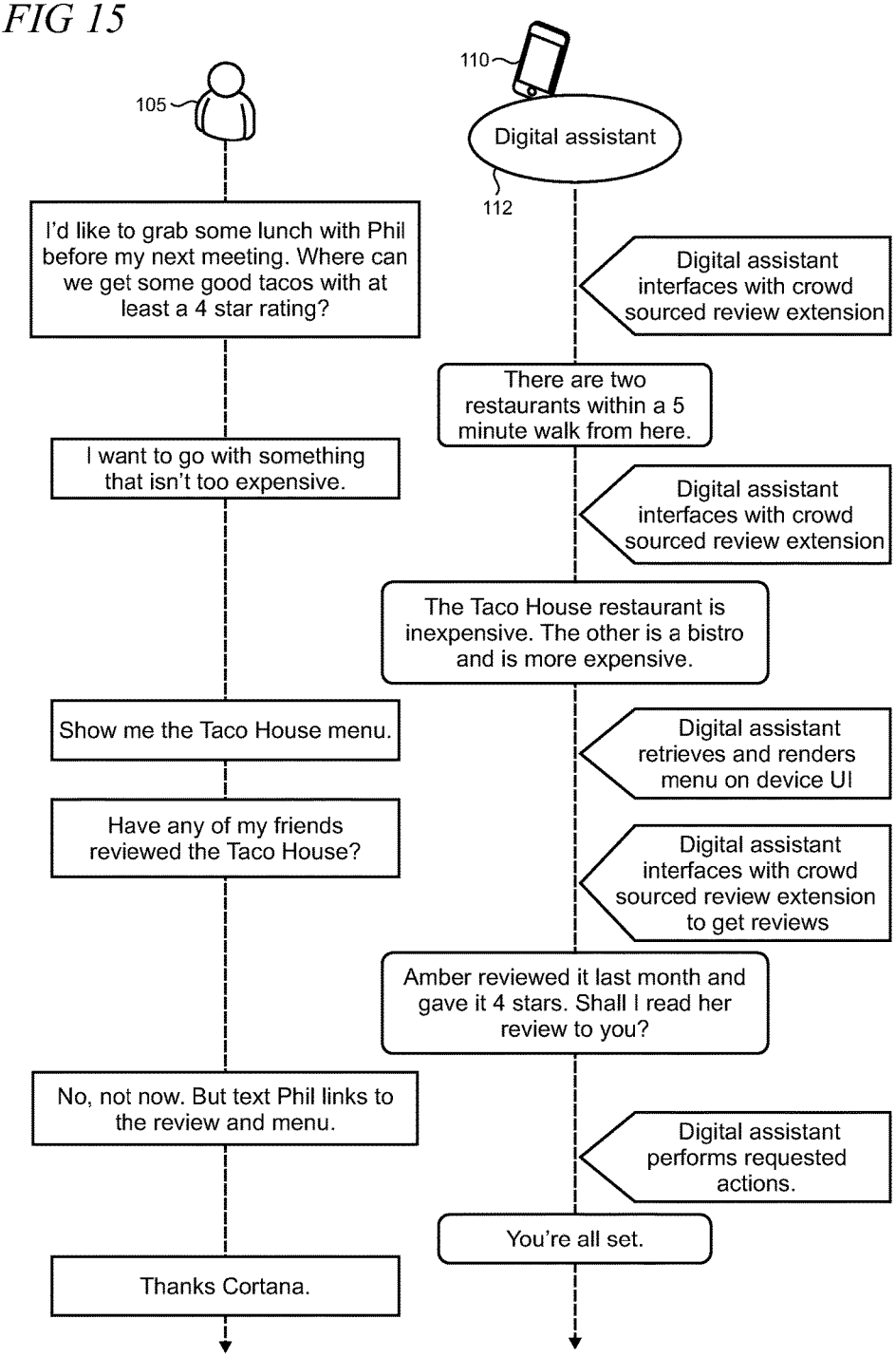

FIGS. 13-15 show illustrative digital assistant extensibility user experiences using the three applications shown in FIG. 12 and described in the accompanying text. In FIG. 13, the user 105 has interactions with the digital assistant 112 (named "Cortana" in this illustrative example) that is operating on device 110. As shown, the digital assistant can interact with the e-commerce application through its extension to surface information about items on the user's wishlist. In FIG. 14, the digital assistant can interact with the movie database application through its extension to find recommended movies for the user. The digital assistant is able to use its ability to track communications in order to find the best way to forward movie information to one of the user's contacts. The user can also invoke a third party application by name, in this case "Xbox Video", so that the digital assistant will interact with the named application in response to the user's requests. Here, the Xbox Video application extension has registered its name as a keyword that enables the user to refer to the application by name when interacting with the digital assistant.

In FIG. 15, the digital assistant interfaces with the crowd-sourced review application through its extension in order to provide restaurant recommendations to the user. The digital assistant can provide a variety of services using the information from the review application such as surfacing recommendations, forwarding menus, providing directions, and the like.

Figure 16:
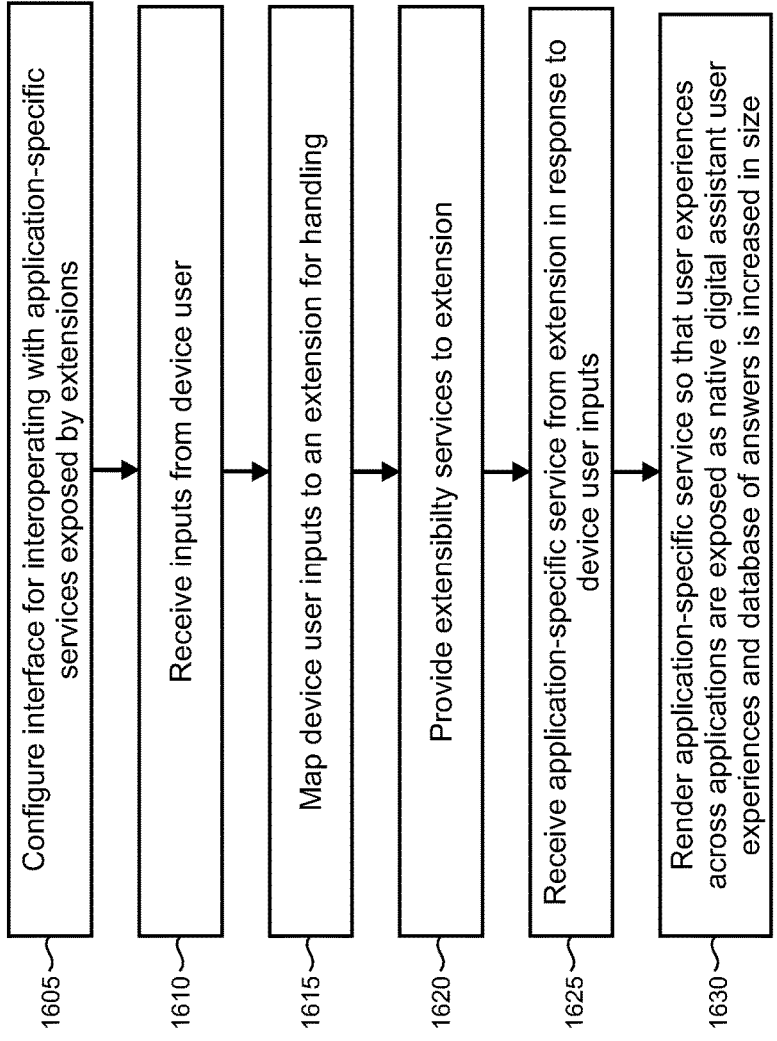
FIGS. 16, 17, and 18 show illustrative methods that may be performed when implementing the present digital assistant extensibility.

FIG. 16 shows a flowchart of an illustrative method 1600 for operating a digital assistant on a device (e.g., device 110). Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1605, an interface is configured for receiving application-specific services from extensions associated with respective applications operating on the device. A user interface is configured to receive voice commands from the device user in step 1610. In step 1615, the received inputs are mapped to respective extensions for handling. In step 1620, digital assistant extensibility services (such as services 900 shown in FIG. 9 and described in the accompanying text) may be exposed to the application extensions.

In step 1625, the digital assistant extensibility client receives an application-specific service from an extension in response to the device user inputs. In step 1630, the application-specific service may be rendered so that user experiences across applications are exposed as native digital assistant user experiences.

Figure 17:
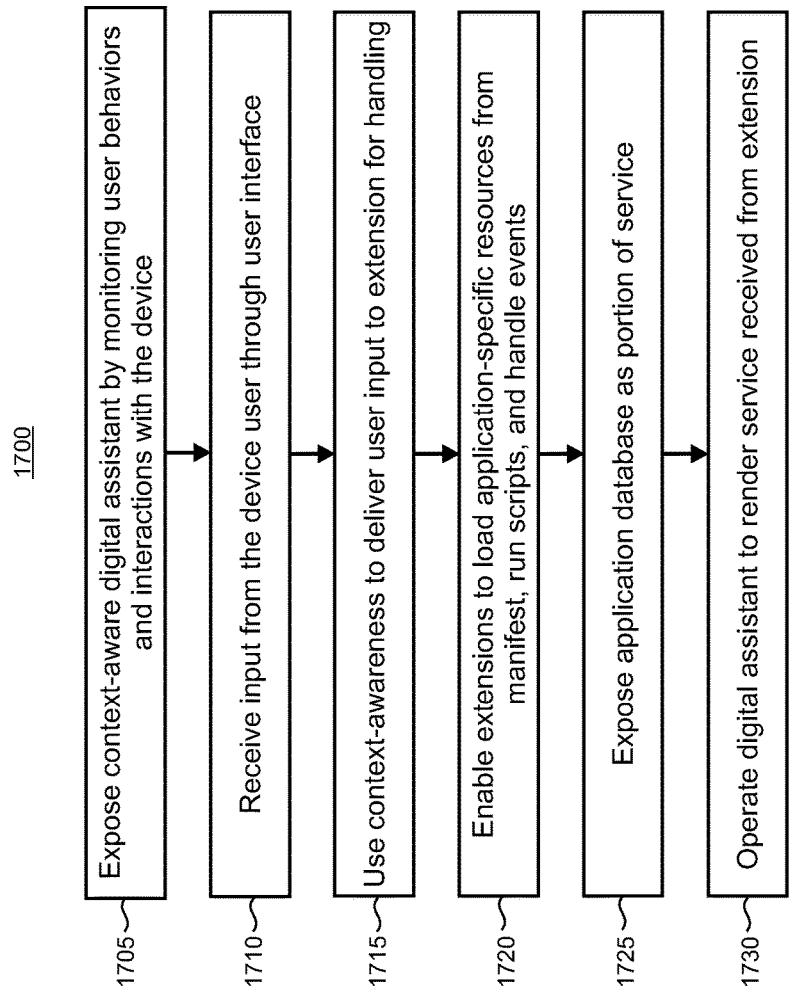

FIG. 17 is a flowchart of an illustrative method 1700 that may be implemented on a device (e.g., device 110). In step 1705, a context-aware digital assistant is exposed on the device in which context-awareness, at least in part, can be gained by monitoring user behaviors and interactions with the device (typically, with notice to the user and consent). In step 1710, inputs from the user are received. In step 1715, the context-awareness is used to deliver the user inputs to application extensions for handling. The application extensions can load application-specific resources, run scripts, and handle events in step 1720. In some cases, an application database can be exposed as a portion of service in step 1725. In step 1730, the digital assistant is operated to render the service received from the extension.

Figure 18:
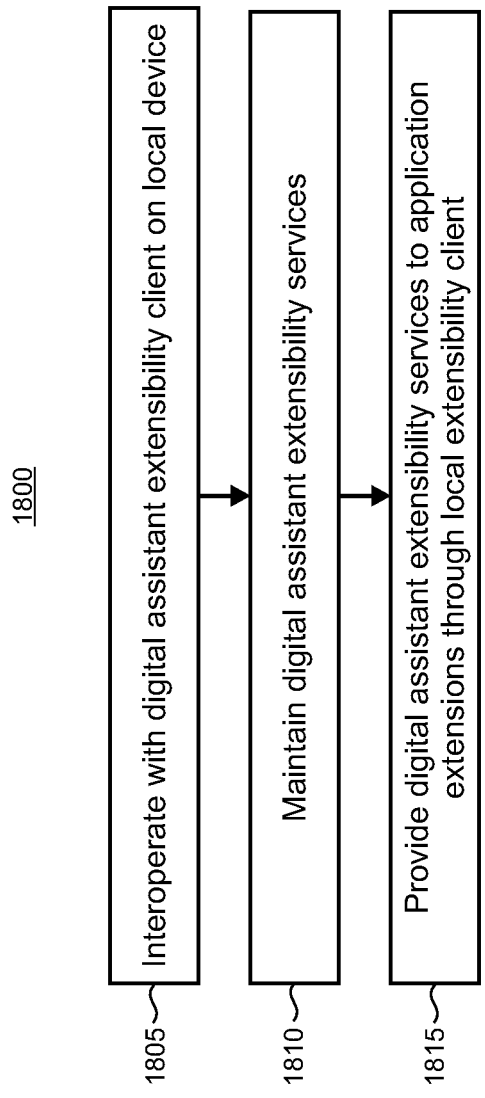

FIG. 18 shows an illustrative method 1800 that may be utilized by a service provider. In step 1805, one or more servers at the provider can interoperate with a digital assistant extensibility client running on a local device. In step 1810, digital assistant extensibility services are maintained which are provided to the application extensions through the local extensibility client in step 1815.

Figure 19:
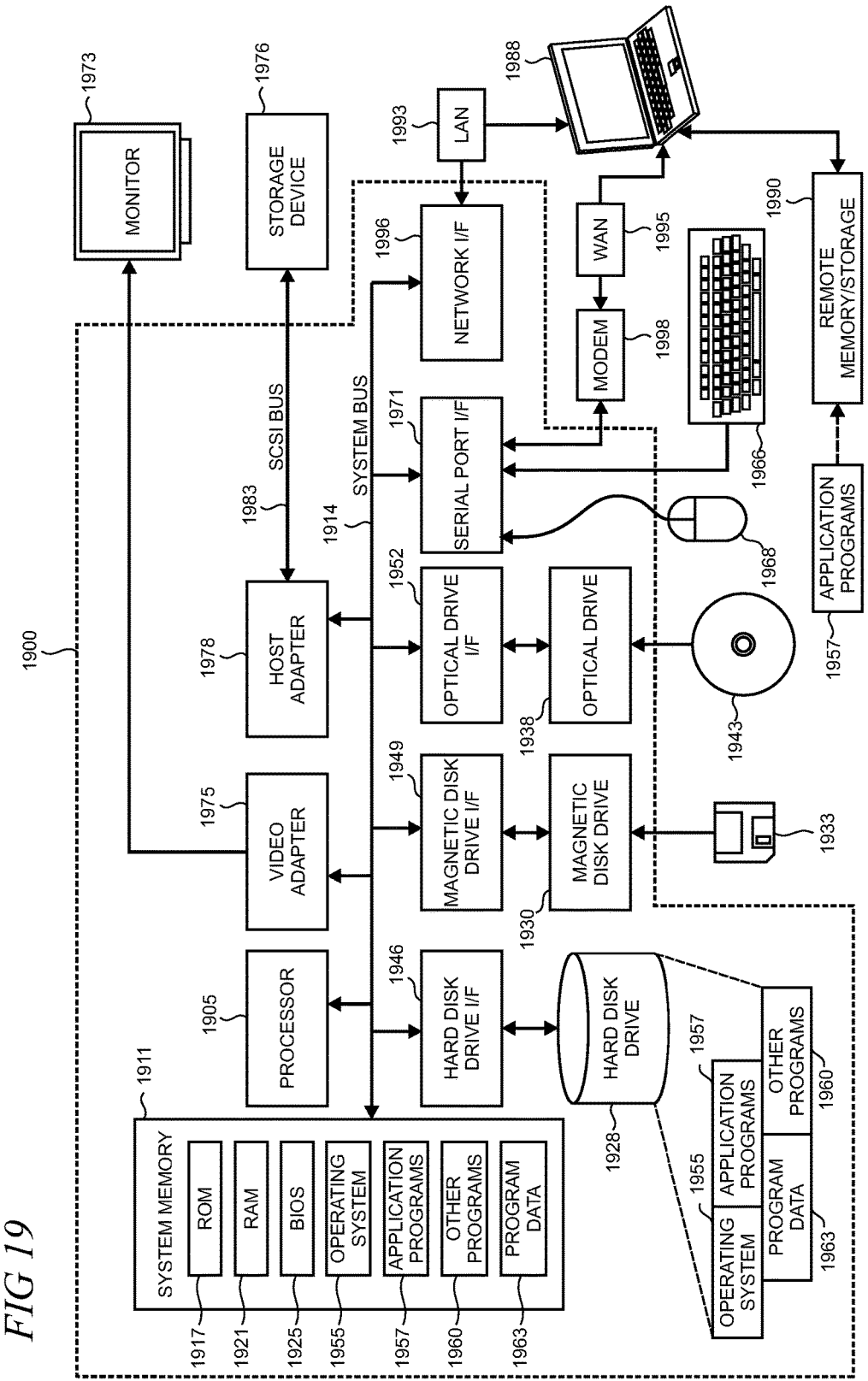
FIG. 19 is a simplified block diagram of an illustrative computer system such as a personal computer (PC) that may be used in part to implement the present digital assistant extensibility.

FIG. 19 is a simplified block diagram of an illustrative computer system 1900 such as a PC, client machine, or server with which the present digital assistant extensibility may be implemented. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present digital assistant extensibility. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present digital assistant extensibility.

Figure 20:
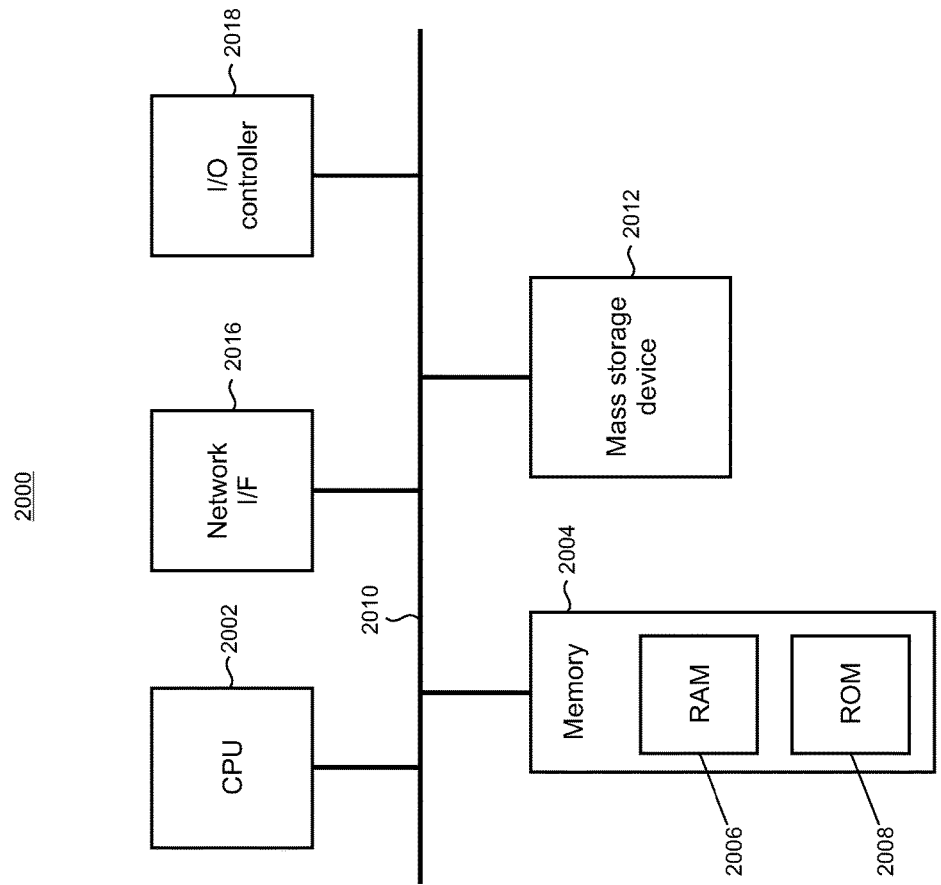
FIG. 20 shows a block diagram of an illustrative device that may be used in part to implement the present digital assistant extensibility.

FIG. 20 shows an illustrative architecture 2000 for a device capable of executing the various components described herein for providing the present digital assistant extensibility. Thus, the architecture 2000 illustrated in FIG. 20 shows an architecture that may be adapted for a server computer, mobile phone, a PDA, a smartphone, a desktop computer, a netbook computer, a tablet computer, GPS device, gaming console, and/or a laptop computer. The architecture 2000 may be utilized to execute any aspect of the components presented herein.

The architecture 2000 illustrated in FIG. 20 includes a CPU (Central Processing Unit) 2002, a system memory 2004, including a RAM 2006 and a ROM 2008, and a system bus 2010 that couples the memory 2004 to the CPU 2002. A basic input/output system containing the basic routines that help to transfer information between elements within the architecture 2000, such as during startup, is stored in the ROM 2008. The architecture 2000 further includes a mass storage device 2012 for storing software code or other computer-executed code that is utilized to implement applications, the file system, and the operating system.

The mass storage device 2012 is connected to the CPU 2002 through a mass storage controller (not shown) connected to the bus 2010. The mass storage device 2012 and its associated computer-readable storage media provide non-volatile storage for the architecture 2000.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It should be appreciated that the network interface unit 2016 also may be utilized to connect to other types of networks and remote computer systems. The architecture 2000 also may include an input/output controller 2018 for receiving and processing input from a number of other devices, including a keyboard, mouse, or electronic stylus (not shown in FIG. 20). Similarly, the input/output controller 2018 may provide output to a display screen, a printer, or other type of output device (also not shown in FIG. 20).

It should be appreciated that the software components described herein may, when loaded into the CPU 2002 and executed, transform the CPU 2002 and the overall architecture 2000 from a general-purpose computing system into a special-purpose computing system customized to facilitate the functionality presented herein. The CPU 2002 may be constructed from any number of transistors or other discrete circuit elements, which may individually or collectively assume any number of states. More specifically, the CPU 2002 may operate as a finite-state machine, in response to executable instructions contained within the software modules disclosed herein. These computer-executable instructions may transform the CPU 2002 by specifying how the CPU 2002 transitions between states, thereby transforming the transistors or other discrete hardware elements constituting the CPU 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2000 in order to store and execute the software components presented herein. It also should be appreciated that the architecture 2000 may include other types of computing devices, including handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
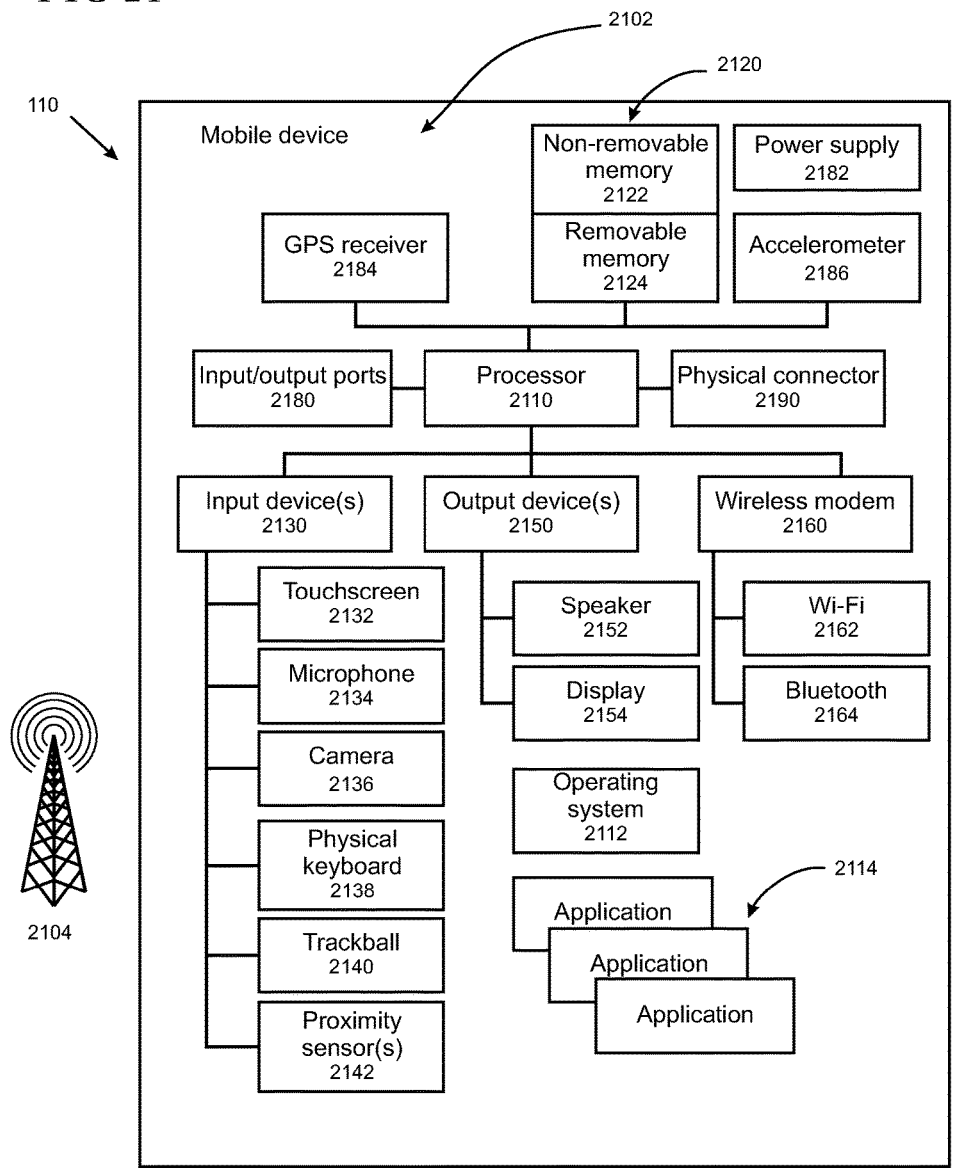
FIG. 21 is a block diagram of an illustrative mobile device.

FIG. 21 is a functional block diagram of an illustrative device 110 such as a mobile phone or smartphone including a variety of optional hardware and software components, shown generally at 2102. Any component 2102 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2104, such as a cellular or satellite network.

The illustrated device 110 can include a controller or processor 2110 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2112 can control the allocation and usage of the components 2102, including power states, above-lock states, and below-lock states, and provides support for one or more application programs 2114. The application programs can include common mobile computing applications (e.g., image-capture applications, email applications, calendars, contact managers, web browsers, messaging applications), or any other computing application.

The illustrated device 110 can include memory 2120. Memory 2120 can include non-removable memory 2122 and/or removable memory 2124. The non-removable memory 2122 can include RAM, ROM, Flash memory, a hard disk, or other well-known memory storage technologies. The removable memory 2124 can include Flash memory or a Subscriber Identity Module (SIM) card, which is well known in GSM (Global System for Mobile communications) systems, or other well-known memory storage technologies, such as "smart cards." The memory 2120 can be used for storing data and/or code for running the operating system 2112 and the application programs 2114. Example data can include web pages, text, images, sound files, video data, or other data sets to be sent to and/or received from one or more network servers or other devices via one or more wired or wireless networks.

The memory 2120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 2130; such as a touchscreen 2132; microphone 2134 for implementation of voice input for voice recognition, voice commands and the like; camera 2136; physical keyboard 2138; trackball 2140; and/or proximity sensor 2142; and one or more output devices 2150, such as a speaker 2152 and one or more displays 2154. Other input devices (not shown) using gesture recognition may also be utilized in some cases. Other possible output devices (not shown) can include piezoelectric or haptic output devices. Some devices can serve more than one input/output function. For example, touchscreen 2132 and display 2154 can be combined into a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the device and a public switched telephone network (PSTN).

The device can further include at least one input/output port 2180, a power supply 2182, a satellite navigation system receiver 2184, such as a GPS receiver, an accelerometer 2186, a gyroscope (not shown), and/or a physical connector 2190, which can be a USB port, IEEE 1394 (FireWire) port, and/or an RS-232 port. The illustrated components 2102 are not required or all-inclusive, as any components can be deleted and other components can be added.

Figure 22:
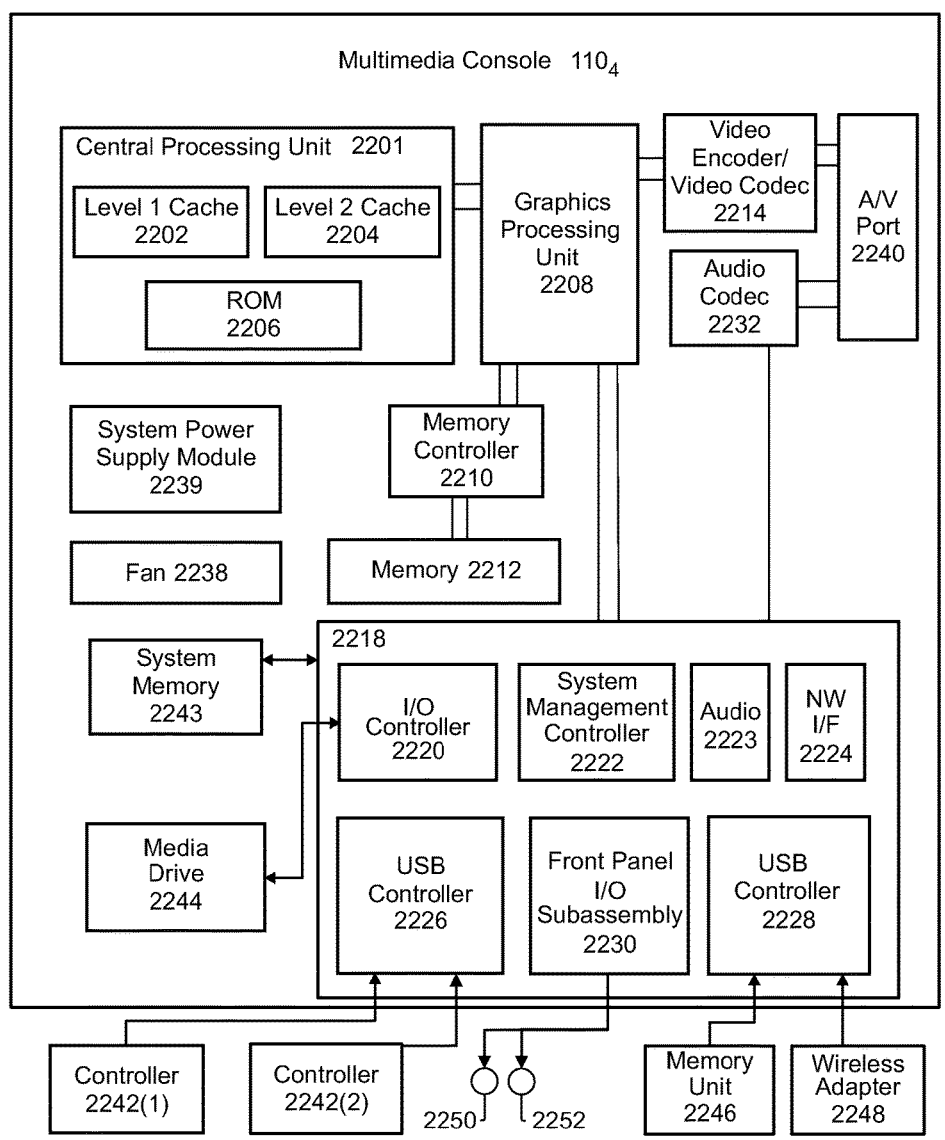
FIG. 22 is a block diagram of an illustrative multimedia console.

FIG. 22 is an illustrative functional block diagram of a multimedia console $110_4$. The multimedia console $110_4$ has a central processing unit (CPU) 2201 having a level 1 cache 2202, a level 2 cache 2204, and a Flash ROM (Read Only Memory) 2206. The level 1 cache 2202 and the level 2 cache 2204 temporarily store data and hence reduce the number of memory access cycles, thereby improving processing speed and throughput. The CPU 2201 may be configured with more than one core, and thus, additional level 1 and level 2 caches 2202 and 2204. The Flash ROM 2206 may store executable code that is loaded during an initial phase of a boot process when the multimedia console $110_4$ is powered ON.

A graphics processing unit (GPU) 2208 and a video encoder/video codec (coder/decoder) 2214 form a video processing pipeline for high speed and high resolution graphics processing. Data is carried from the GPU 2208 to the video encoder/video codec 2214 via a bus. The video processing pipeline outputs data to an A/V (audio/video) port 2240 for transmission to a television or other display. A memory controller 2210 is connected to the GPU 2208 to facilitate processor access to various types of memory 2212, such as, but not limited to, a RAM.

The multimedia console $110_4$ includes an I/O controller 2220, a system management controller 2222, an audio processing unit 2223, a network interface controller 2224, a first USB (Universal Serial Bus) host controller 2226, a second USB controller 2228, and a front panel I/O subassembly 2230 that are preferably implemented on a module 2218. The USB controllers 2226 and 2228 serve as hosts for peripheral controllers 2242(1) and 2242(2), a wireless adapter 2248, and an external memory device 2246 (e.g., Flash memory, external CD/DVD ROM drive, removable media, etc.). The network interface controller 2224 and/or wireless adapter 2248 provide access to a network (e.g., the Internet, home network, etc.) and may be any of a wide variety of various wired or wireless adapter components including an Ethernet card, a modem, a Bluetooth module, a cable modem, or the like.

System memory 2243 is provided to store application data that is loaded during the boot process. A media drive 2244 is provided and may comprise a DVD/CD drive, hard drive, or other removable media drive, etc. The media drive 2244 may be internal or external to the multimedia console $110_4$. Application data may be accessed via the media drive 2244 for execution, playback, etc. by the multimedia console $110_4$. The media drive 2244 is connected to the I/O controller 2220 via a bus, such as a Serial ATA bus or other high speed connection (e.g., IEEE 1394).

The system management controller 2222 provides a variety of service functions related to assuring availability of the multimedia console $110_4$. The audio processing unit 2223 and an audio codec 2232 form a corresponding audio processing pipeline with high fidelity and stereo processing. Audio data is carried between the audio processing unit 2223 and the audio codec 2232 via a communication link. The audio processing pipeline outputs data to the A/V port 2240 for reproduction by an external audio player or device having audio capabilities.

The front panel I/O subassembly 2230 supports the functionality of the power button 2250 and the eject button 2252, as well as any LEDs (light emitting diodes) or other indicators exposed on the outer surface of the multimedia console $110_4$. A system power supply module 2239 provides power to the components of the multimedia console $110_4$. A fan 2238 cools the circuitry within the multimedia console $110_4$.

The CPU 2201, GPU 2208, memory controller 2210, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 2243 into memory 2212 and/or caches 2202 and 2204 and executed on the CPU 2201. The application may present a graphical user interface that provides a consistent user experience when navigating to different media types available on the multimedia console $110_4$. In operation, applications and/or other media contained within the media drive 2244 may be launched or played from the media drive 2244 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 2224 or the wireless adapter 2248, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2201 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2242(1) and 2242(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present digital assistant extensibility to third party applications are now presented by way of illustration and not as an exhaustive list of all embodiments. An example includes a method for implementing extensibility of a digital assistant operating on a device to one or more applications, comprising: configuring an interface for interoperating with application-specific services exposed by extensions associated with respective ones of the applications; receiving input from a device user; mapping the device user input to an extension for handling; and receiving an application-specific service from the extension in response to the device user inputs.

In another example, the method further includes rendering the application-specific service so that user experiences across the applications are exposed to the device user as native digital assistant user experiences and whereby the application-specific service increases a size of a database of answers available to the digital assistant. In another example, the method further includes using contextual data when performing the mapping. In another example, the contextual data comprises one or more of time/date, location of the user or device, language, schedule, applications installed on the device, user preferences, user behaviors, user activities, stored contacts, call history, messaging history, browsing history, device type, device capabilities, or communication network type. In another example, the method further includes providing extensibility services to the applications, the extensibility services including one or more of language services, vocabulary services, user preference services, or context services. In another example, the method further includes receiving portions of the extensibility services from a remote service provider. In another example, the method further includes supporting the interface with an extensibility client that is configured for interaction with the remote service provider. In another example, the method further includes loading application-specific resources from a manifest included in the application extension, the application-specific resources at least including keywords that are registered with the digital assistant. In another example, the application extension further includes logic for implementing a user experience or a user interface using the digital assistant. In another example, the method further includes configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

A further example includes a device, comprising: one or more processors; a user interface (UI) for interacting with a user of the device using graphics and audio; and a memory device storing code associated with one or more applications and computer-readable instructions which, when executed by the one or more processors, perform a method comprising the steps of: exposing a digital assistant on the device for maintaining context-awareness for a device user by monitoring user behaviors and interactions with the device, the digital assistant further interacting with the device user using voice interactions through the UI, receiving an input from the device user through the UI, using the context-awareness to deliver an input to an extension to an application for handling, the application extension being configured to deliver services from the application into user experiences renderable by the digital assistant, and operating the digital assistant to render the services to the device user through the UI.

In another example, the device further includes exposing one or more extensibility services to the application extension. In another example, the device further includes enabling the application extension to load application-specific resources from a manifest into a runtime environment for execution. In another example, the application extension includes an event handler. In another example, the application extension includes logic comprising one of script or programming construct. In another example, the device further includes exposing one or more databases associated with the application to the digital assistant using the application extension.

A further example includes one or more computer-readable memory devices storing instructions which, when executed by one or more processors disposed in a computer server, perform a method comprising the steps of: interoperating with a digital assistant extensibility client on a local device, the digital assistant extensibility client exposing an application programming interface (API) to one or more application extensions being executable on the device, each of the application extensions being configured to deliver services from respective applications into user experiences renderable by the digital assistant; maintaining digital assistant extensibility services including at least one of i) language services that enable applications to use one or more different languages when rendering a user experience on the local device, ii) vocabulary services that enable applications to handle unknown words or phrases when rendering the user experience, iii) user preference services that enable applications to employ user preferences that are maintained by the digital assistant, or iv) context services that enable applications to utilize context-awareness when delivering services; and providing the digital assistant extensibility services to the one or more application extensions through the API exposed by the digital assistant extensibility client on the local device.

In another example, the digital assistant extensibility services and digital assistant extensibility client provide a platform supporting user experiences that are renderable on the local device across all the applications as a native digital assistant experience. In another example, the application extensions contain application-specific resources written to a manifest which is loaded into a runtime environment. In another example, the application extensions are authored by third party developers.

Based on the foregoing, it should be appreciated that technologies for digital assistant extensions have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for implementing extensibility of a digital assistant operating on a device used by a user to one or more applications, comprising:
    configuring an interface for interoperating with application-specific services exposed by application extensions associated with respective ones of the applications, wherein each application extension is instantiated locally on the device and comprises a manifest of resources that are specific to a related application, an event handler, and logic;
    receiving from the respective ones of the applications a request to access digital assistant resources that describe capabilities and resources to facilitate interaction between the respective ones of the applications and the digital assistant;
    loading the manifest of resources from the related application to a digital assistant extensibility client, the manifest of resources including one or more keywords specific to the related application;
    registering at least the one or more keywords with the digital assistant extensibility client;
    receiving input from the device user to execute an event and invoke the one or more registered keywords;
    based on the received input and invocation of the one or more registered keywords, mapping the device user input to an application extension for handling;
    receiving an initial application-specific service from the application extension in response to the device user input; and
    after receiving the initial application-specific service, receiving a subsequent application-specific service from a different application, in which the subsequent application-specific service is based on context from the initial application-specific service.

2. The method of claim 1 further including rendering the application-specific services so that user experiences across the applications are exposed to the device user as native digital assistant user experiences and whereby the application-specific services increase a size of a database of answers available to the digital assistant.

3. The method of claim 1 further including using contextual data when performing the mapping.

4. The method of claim 3 in which the contextual data comprises one or more of time/date, location of the user or device, language, schedule, applications installed on the device, user preferences, user behaviors, user activities, stored contacts, call history, messaging history, browsing history, device type, device capabilities, or communication network type.

5. The method of claim 1 further including providing extensibility services to the respective ones of the applications, the extensibility services including one or more of language services, vocabulary services, user preference services, or context services.

6. The method of claim 5 further including receiving portions of the extensibility services from a remote service provider.

7. The method of claim 1 in which the application extension further includes logic for implementing a user experience or a user interface using the digital assistant.

8. The method of claim 1 further including configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

9. The method of claim 1 in which the one or more keywords specifically identify the respective application.

10. The method of claim 1 in which the subsequent application-specific service is received through a series of interactions from the user at the digital assistant.

11. A device, comprising:
    one or more processors;
    a user interface (UI) for interacting with a user of the device using graphics and audio; and
    a memory device storing code associated with one or more applications and computer-readable instructions which, when executed by the one or more processors, cause the device to:
        expose a digital assistant on the device configured to maintain context-awareness for a device user by monitoring user behaviors and interactions with the device, the digital assistant further configured to interact with the device user using voice interactions through the UI, wherein each application extension is instantiated locally on the device and comprises a manifest of resources that are specific to a related application, an event handler, and logic, receive from the respective one or more applications a request to access digital assistant resources that describe capabilities and resources to facilitate interaction between the respective one or more applications and the digital assistant, load the manifest of resources from the related application to a digital assistant extensibility client, the manifest of resources including one or more keywords specific to the related application, register at least the one or more keywords with the digital assistant extensibility client, receive an input from the device user through the UI to execute an event and invoke the one or more registered keywords, use the context-awareness, received input, and the invocation of the one or more registered keywords to deliver the input to an application extension for handling, the application extension being configured to deliver initial services from a related application, operate the digital assistant to render the initial services to the device user through the UI, and after operating the digital assistant to render the initial services associated with an initial application, operate a subsequent service using a subsequent application based on context from the initial services.

12. The device of claim 11 further including instructions to cause the device to expose one or more extensibility services to the application extension.

13. The device of claim 11 further including instructions to cause the device to enable the application extension to load application-specific resources from the manifest into a runtime environment for execution.

14. The device of claim 13 in which the application extension includes the event handler.

15. One or more computer-readable memory devices storing instructions which, when executed by one or more processors disposed in a computer server, cause the computer server to:

interoperate with a digital assistant extensibility client on a local device, the digital assistant extensibility client exposing an application programming interface (API) to one or more application extensions being executable on the local device, each of the application extensions being configured to deliver services from respective applications into user experiences renderable by a digital assistant;

maintain digital assistant extensibility services including i) language services that enable applications to use one or more different languages when rendering a user experience on the local device, or ii) vocabulary services that enable applications to handle unknown words or phrases when rendering the user experience; and provide the digital assistant extensibility services to the one or more application extensions through the API exposed by the digital assistant extensibility client on the local device, wherein each application extension is instantiated locally on the local device and comprises a manifest of resources that are specific to a respective application, an event handler, and logic, wherein each application extension is loaded into a local runtime environment on the local device to receive events according to the manifest of resources, utilize the resources, and apply the logic to render a user experience by the digital assistant, and wherein multiple application extensions are usable by the digital assistant within a series of interactions, such that previous interactions that invoke an initial application extension are utilized to identify and use subsequent application extensions.

16. The one or more computer-readable memory devices of claim 15 in which the digital assistant extensibility services and digital assistant extensibility client provide a platform supporting user experiences that are renderable on the local device across all the applications as a native digital assistant experience.

17. The one or more computer-readable memory devices of claim 15 in which the application extensions contain application-specific resources written to the manifest of resources which is loaded into the local runtime environment.

18. The one or more computer-readable memory devices of claim 17 in which the application extensions are authored by third party developers.

* * * * *